Feb. 5, 1952 R. S. PYNE 2,584,499
APPARATUS FOR PRECISION BORE GRINDING
Filed Aug. 2, 1948 6 Sheets-Sheet 3

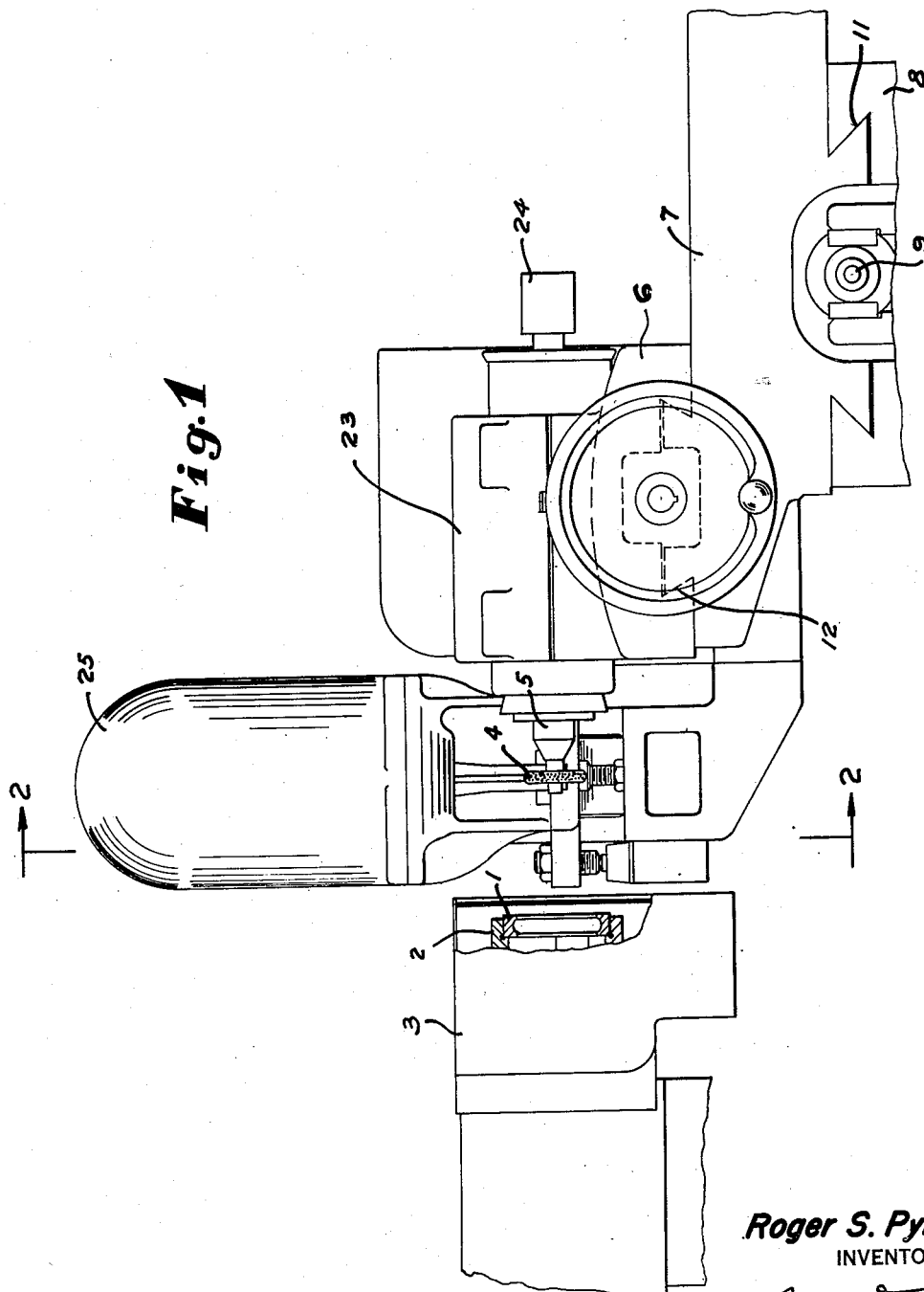

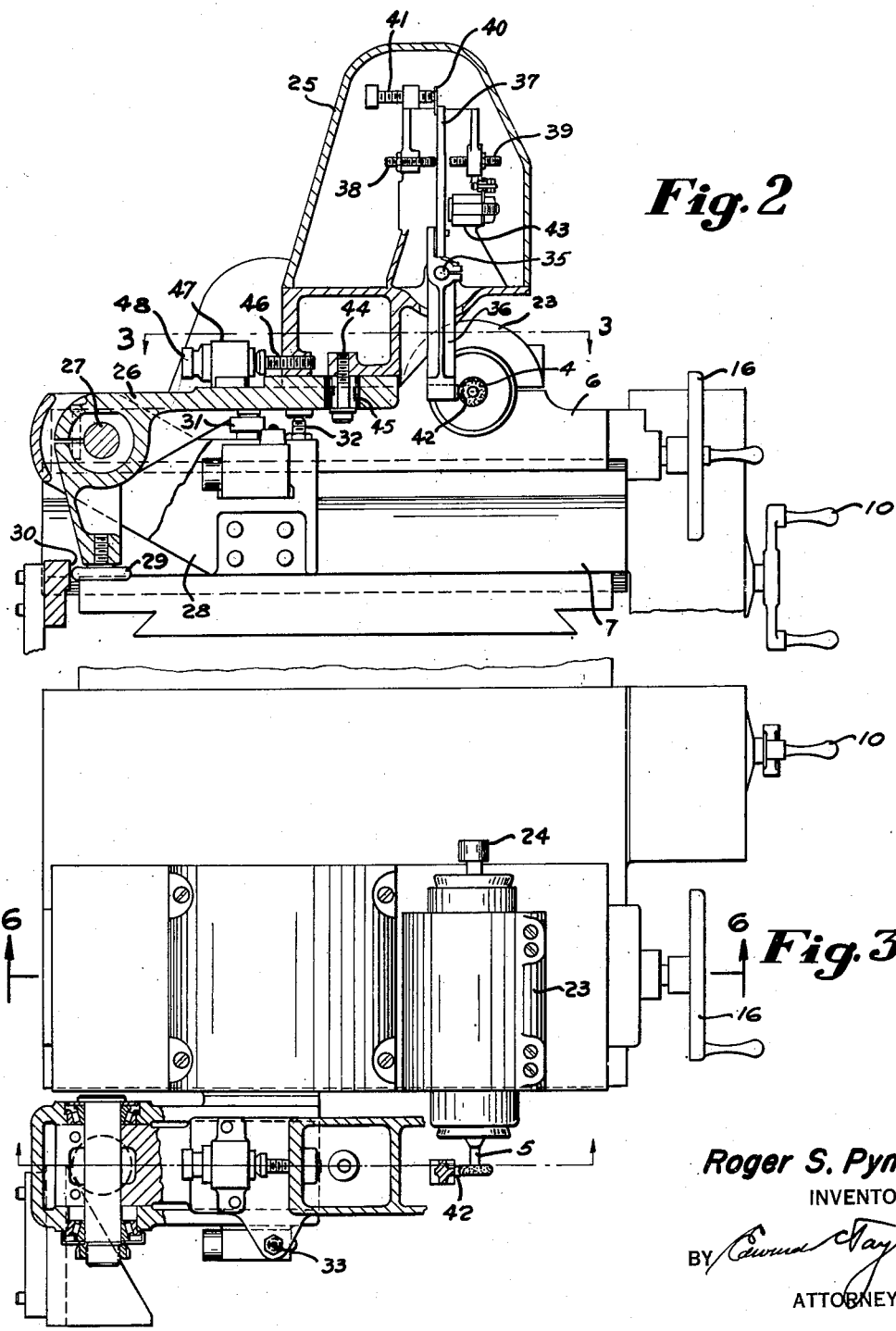

Roger S. Pyne
INVENTOR
BY Edward C. Taylor
ATTORNEY

Roger S. Pyne
INVENTOR

BY *Edward C. Taylor*
ATTORNEY

Feb. 5, 1952     R. S. PYNE     2,584,499
APPARATUS FOR PRECISION BORE GRINDING
Filed Aug. 2, 1948     6 Sheets-Sheet 6
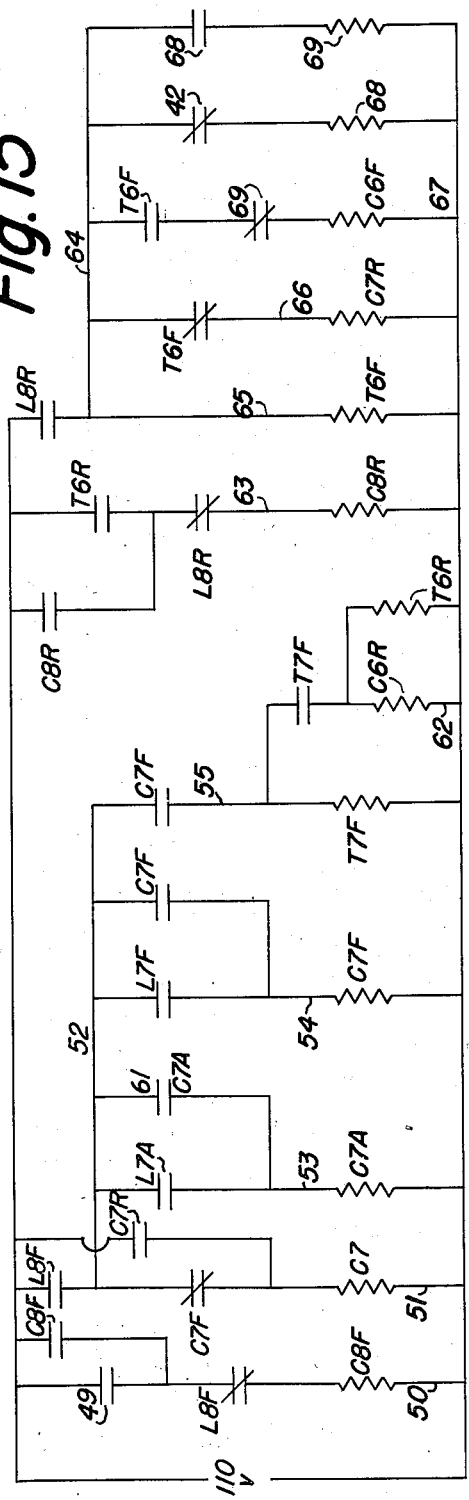
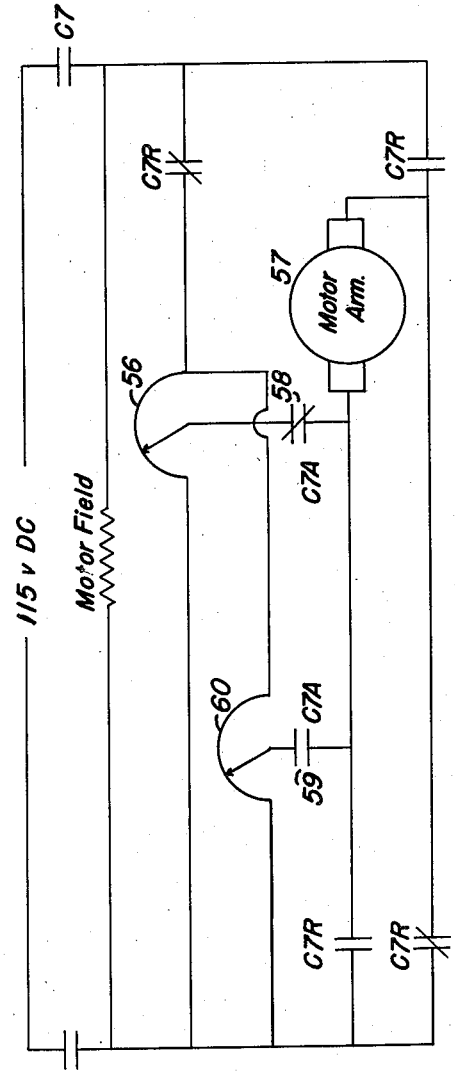
Roger S. Pyne
INVENTOR
BY
ATTORNEYS Patented Feb. 5, 1952

2,584,499

UNITED STATES PATENT OFFICE 2,584,499

APPARATUS FOR PRECISION BORE GRINDING

Roger S. Pyne, Longmeadow, Mass., assignor to Van Norman Company, Springfield, Mass., a corporation of Massachusetts Application August 2, 1948, Serial No. 41,996

6 Claims. (Cl. 51—165)

1

This invention relates to a method and an apparatus for increasing the accuracy of internal grinding, of particular utility when the bore is so small that there is not enough room within it for both a grinding wheel and a feeler for determining continuously the size to which the hole has been ground. The method is of especial value in grinding grooves in the outer races for ball bearings, since in such cases the grinding wheel cannot be withdrawn periodically in an axial direction to permit a feeler to enter the bore, or to contact the withdrawn wheel, as is sometimes done when cylindrical bores are being ground. The invention may, however, be applied to cylindrical bores as well as to groove grinding and in the latter case may be used where the grinding is done by the plunge cut method as well as on an oscillating grinder. As well as increasing the accuracy of the grinding operation the speed of grinding will be increased over cases where the grinding wheel has to be removed from the work at intermediate periods in a single grinding cycle in order to gauge either the wheel or the work. Additional objects and advantages will appear from the following description and claims.

The invention will now be described with reference to the accompanying drawings, in which Fig. 1 is a front elevation of a portion of an oscillating grinding machine designed for producing outer races for ball bearings and constructed in accordance with the present invention;

Fig. 2 is a section thereof on line 2—2 of Fig. 1;

Fig. 3 is a top plan of the machine with certain parts broken away on line 3—3 of Fig. 2;

Fig. 15 is a diagram of one manner of operating the mechanism automatically; and Fig. 16 is a continuation of Fig. 15 showing the control circuit for the main cross slide.

Figure 4:
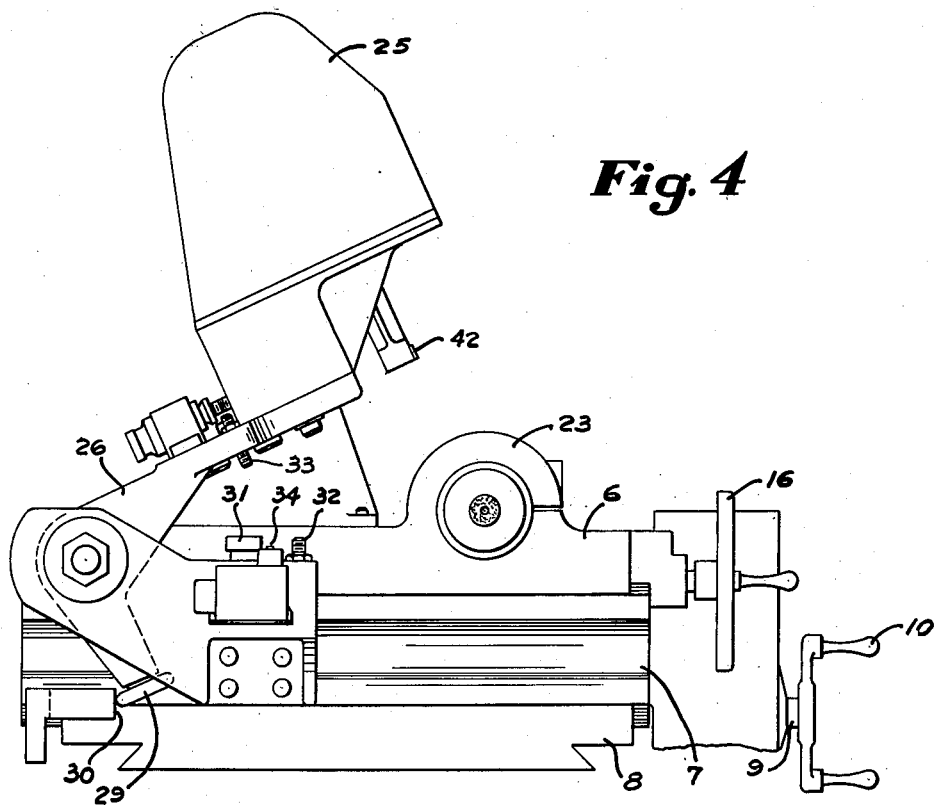
Fig. 4 is a view of the left hand side (as viewed in Fig. 1) of the spindle and supporting slides, with the gauging mechanism elevated into the position assumed during the grinding cycle.
Figure 5:
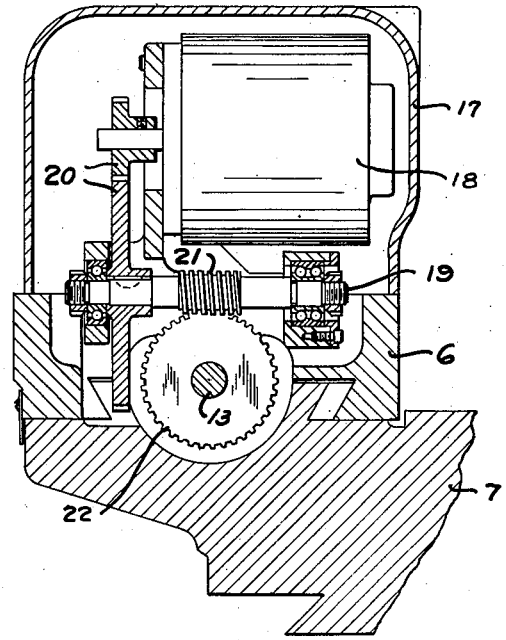
Fig. 5 is a section substantially on line 5—5 of Fig. 6.
Figure 6:
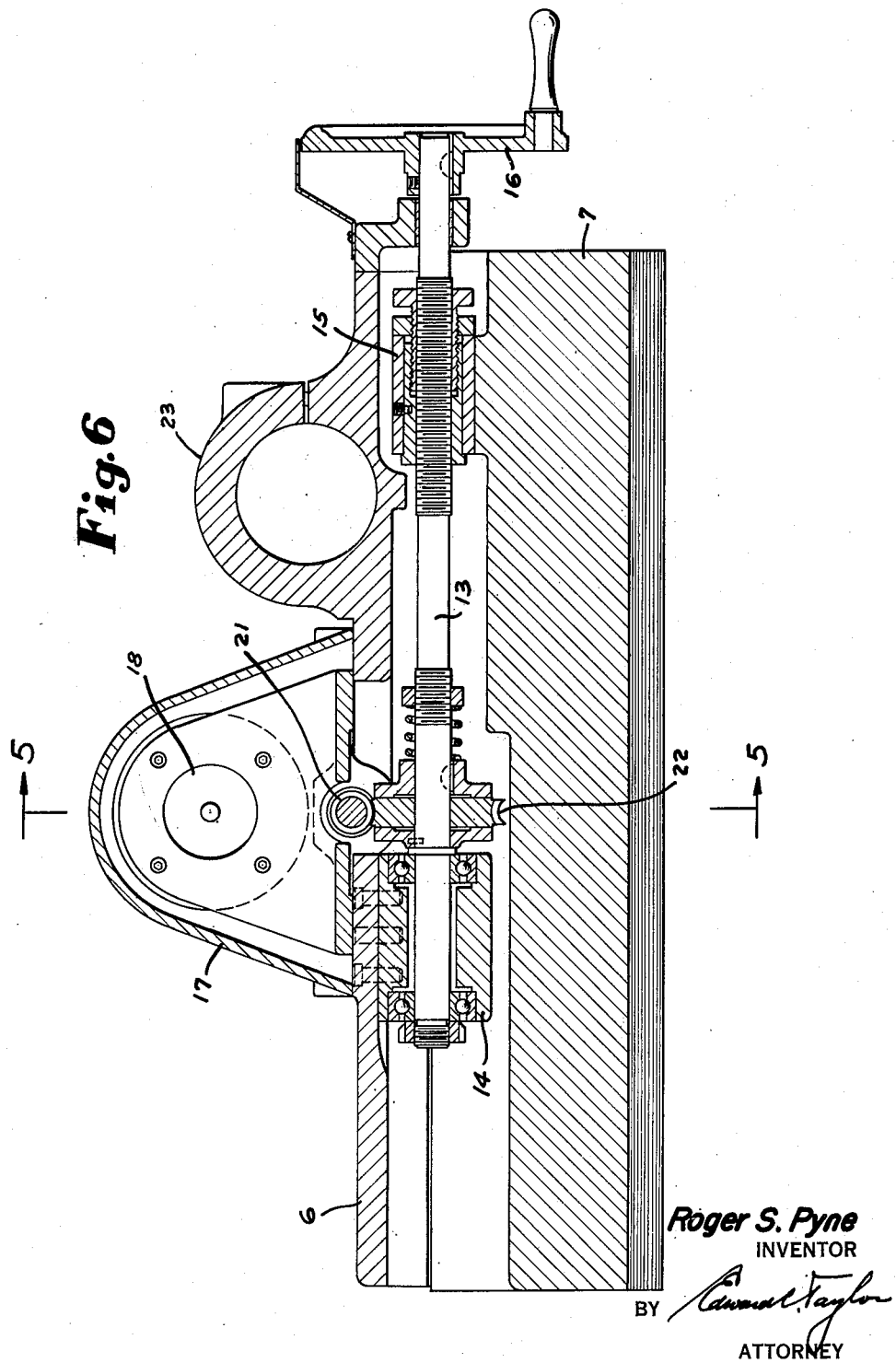
Fig. 6 is a section on line 6—6 of Fig. 3.

The grinding of a work piece in accordance with the invention may be carried on by hand control of an internal grinding machine with upper and lower cross slides to which a gauge has been added to determine the initial position of the grinding side of the wheel relative to the main cross slide. It will first be so described, although it is apparent that it is preferable that the grinding machine be controlled automatically.

The outer race 1 to be ground is carried in a

2 suitable chuck 2 (Fig. 1) on an oscillating work head 3, as shown for example in the patent to Van Norman et al., 2,149,409, March 7, 1939; the chuck and oscillating work head being shown here in outline only. The grinding wheel 4 is mounted on a spindle 5 carried by an upper slide 6. This slide is mounted for movement transverse to the axis of the spindle on a cross slide 7, which in turn is mounted for movement parallel to that of the upper slide and transverse to that of a longitudinally sliding table 8. It will be apparent that the wheel may be moved toward and away from the side of the bore being ground by movement of either of the slides 6 and 7, and can be inserted or withdrawn from the bore by movement of the table 8.

In accordance with the invention the motion of the slide 7 controls the onsetting and offsetting of the wheel relative to the work preparatory to and following the grinding operation as well as the actual feeding of the wheel during grinding, and the slide 6 corrects the position of the wheel 4 on the slide 7 as the wheel wears. In addition to the other functions it performs the slide 7 moves to a fixed position which terminates the active part of the grinding cycle. As long as the amount of stock to be removed from successive work pieces is substantially constant (it may be kept so by rough grinding the work pieces to standard dimensions on another machine if the initial sizes of different pieces tend to show large dimensional differences) the wear of the wheel on successive work pieces will also be substantially constant. Between grinding operations the slide 6 is advanced until the active side of the grinding wheel is stopped by contact with a feeler, to be described later, which is carried by the slide 7 and thus always positions the active side of the grinding wheel in a constant relation to the slide 7 at the start of a grinding operation. During the next grinding operation the wheel will of course wear, and by proper adjustment of the feeler the wheel can be caused to end the grinding cycle with the work piece at the exact diameter desired. It is perfectly possible to grind successive bores with an average variation of less than 0.0001" by this method, without making any measurement of the work piece during grinding. Work pieces should be checked periodically for size as a safety measure, but the tolerances mentioned can be obtained as long as temperature changes in the cooling water or ambient air, in the rate of wear of the wheel, or other similar factors affecting the grinding operation incidentally, do not become too great.

As soon as the advance of the slide 7 has been stopped by reason of it having arrived at the fixed position referred to above, and a suitable time elapsed to permit the wheel to "spark out" if desired, the slide 6 is withdrawn a short distance (say a few thousandths) at a slow rate. This slow retraction, conveniently controlled by a time relay, keeps the rate at which the wheel leaves contact with the surface of the bore so low that vibration, uneven grinding, and marks on the work will be avoided. When this distance has been traversed, the slide 7 and the table 8 are moved respectively radially and axially of the work piece to remove the grinding wheel from the bore and to the gauging position at which it is to be set relatively to the slide 7 by adjustment of the upper slide 6. This adjustment sets the grinding wheel so that the normal feeding advance of the slide 7 will just bring the work piece to the correct diameter if the wheel wears down the expected amount. In other words, the wheel is preset so that it would, if no work piece were present, stop its feeding motion at a distance beyond the correct work surface an amount equal to the expected wear on the wheel for one grinding cycle. It should be emphasized that it is not necessary that the position of the wheel at the time it is preset should be in line with this assumed stopping position, it being sufficient that when the wheel is preset the slide 7 is at a fixed distance from its own stopping position at the termination of grinding. Indeed, if the feeler by which the wheel is stopped in the presetting operation is, as is preferred, carried by the slide 7, no definite position of that slide at the time of presetting is required, as all that is being done is to set slide 6 in a fixed position relative to slide 7.

Before continuing with a detailed discussion of the gauging operation the structure of the machine will be considered. The main cross slide 7 is provided with a lead screw 9 (Fig. 1) which can be rotated by a handwheel 10 or by suitable power means such as described in the Van Norman patent referred to above. As is common, the slide 7 moves in ways 11 on the longitudinally reciprocable table 8. The upper slide 6 moves in ways 12 on the lower slide 7, and is provided with a lead screw 13 held against longitudinal movement relative to the upper slide by a thrust box 14 and threaded into a nut 15 secured firmly to the lower slide. The lead screw 13 may be rotated by a handwheel 16 or by a power mechanism mounted in a housing 17. Within this housing is a motor 18 of a low speed type, preferably having about one revolution per minute. Its shaft is connected to an intermediate shaft 19 by gearing 20, and a worm 21 on the shaft 19 meshes with a worm wheel 22 on the lead screw 13 and preferably coupled to it through a friction clutch to permit of operation by the handwheel 16. The lead screw can be rotated very slowly when the motor is energized, so that at each cycle the slide 6 can be advanced an amount approximately commensurate with the wear of the wheel. Since this may be on the order of a thousandth of an inch or less the need for very slow rotation of the lead screw is evident, as is the need for having the parts constructed with the utmost precision and with all possible backlash eliminated. The spindle 5 carrying the wheel 4 is carried in a clamp bracket 23 on the slide 6, and is provided with a pulley 24 by which it may be rotated by any suitable means.

The gauging mechanism by which the presetting advance of the upper slide 6 is arrested is carried in a housing 25 on an arm 26 swinging upon a pivot 27 on a bracket 28 secured to the lower slide 7. This slide is carried back and forth toward and away from the work by the longitudinally moving table, and to prevent the gauging mechanism from striking the work head the arm 26 has a roll 29 riding on a cam 30 secured to the machine frame. As the table moves towards the work the cam lifts the arm from the position of Fig. 2 to that of Fig. 4. When the table moves away from the work the arm is lowered, striking a spring plunger or dashpot 31 to reduce shock and finally a positioning abutment 32 which supports it in gauging position.

Within the gauge housing 25 is a pivot 35 on which is pivoted an arm 36 having an upward extension 37 oscillatable between adjustable stops 38 and 39. When the arm is in the position of Fig. 2 the extension 37 is in contact with stop 38, and a spring contact 40 on the extension is in engagement with a screw contact 41 adjustable within the housing. The lower end of the gauge arm 36 carries a block 42 of hard material such as tungsten carbide which is substantially unaffected by momentary contact with the grinding wheel. When in its presetting position the wheel is advanced by movement of the upper slide 6 until it strikes the gauge block 42. This rocks the gauge arm 36 and breaks the contact between the members 40 and 41. Preferably this activates an electromagnet 43 which holds the arm temporarily in a position out of contact with the wheel.

The gauge housing 25 is adjustably mounted on the arm 26 by a clamp screw 44 extending through a slot 45 in the arm; and is provided with an adjusting screw 46 threaded into a block 47 on the arm so that it can be shifted parallel to the direction of movement of the slide 7 to change the position of the gauge block relative thereto. The screw is preferably provided with a graduated head 48 so that the position of the gauge block can be read directly.

Figure 7:
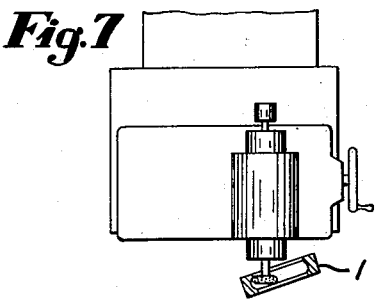
Figs. 7 to 14 are diagrammatic views showing successive stages in the grinding and gauging operations.
Figure 8:
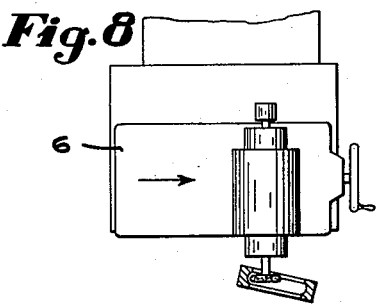
Figure 9:
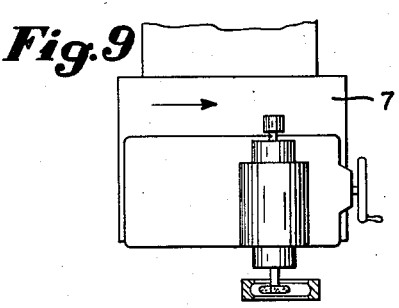

The operation will now be considered with reference to Figs. 7 to 14. Fig. 7 shows the condition at the termination of the grinding operation, during which it should be remembered that there is no gauging being done either of the wheel or work. The grinding is stopped by the lower cross slide 7 reaching a mechanical stop or limit switch, or being manually arrested at a constant point as indicated by the handwheel 10. After a period of dwell to allow for sparking out, if desired, the upper slide 6 is backed away slightly and slowly as in Fig. 8 a few thousandths of an inch to remove the wheel from contact with the work without chatter. The oscillation and rotation of the work head then are stopped, in any conventional or desired way, with the work piece in approximate alignment with the spindle (Fig. 9). When this has been done the slide 7 is moved radially of the work (Fig. 9) and the table 8 longitudinally of it (Fig. 10) to bring the grinding wheel to its resetting position with the slide 7 in an accurately fixed position. As long as this position is reproduced exactly at each cycle its absolute location relative to the work piece is of no importance; and as stated above, if the gauge is carried by the slide 7 and not by a part of the machine in fixed relation to the work piece, even this amount of absolute location is not necessary since the wheel adjusting operation is merely one of setting the wheel at each cycle in a fixed position relative to the main cross slide 7. The shifting of the slide 7 can in either case be done in the manner described in the Van Norman et al. Patent 2,149,409. The position of the slide 6 on the slide 7 just prior to the presetting operation is not material as long as the wheel is retracted enough not to strike the feeler, since in any event the presetting operation is merely moving the slide 6 forwardly until the wheel strikes the feeler, which is in fixed position relative either to the slide 7 or to the work piece. Thus the backing off operation of Fig. 8 need not be carried on with great accuracy.

Figure 10:
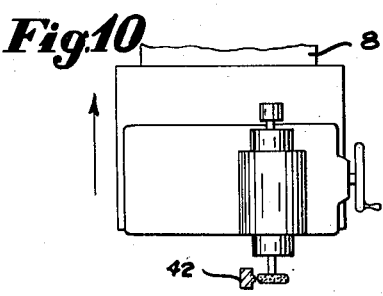

With the wheel thus brought to the initial presetting position of Fig. 10, a delay of two to three seconds is introduced by a time delay relay to allow vibrations to damp out. Alternatively, the backing off by rotation of feed screw 7, described below in connection with Fig. 12, may be done at this point so as to give time for damping following the rapid movement of slide 7 and table 8 to presetting position, in which case no separate delay is needed. The slide 6 is then advanced by the slow speed motor 18 until the wheel by striking the gauge block 42 and thus breaking the engagement between contacts 40 and 41 stops the motor. The position in which this occurs can be regulated by the adjusting screw 46, which varies the position of the gauge block 42 relative to the slide 7; and is chosen so that when the slide 7 stops in its feeding motion at a fixed point at the end of the next grinding cycle the work piece will have been correctly ground. This is equivalent to presetting the wheel on the slide 7 so that if no work piece were present to cause wear, the final position of the active surface of the grinding wheel would project beyond the axis of work rotation a distance equal to the radius of work piece desired plus the amount of wheel wear occurring in the grinding of a single work piece. The advance of slide 6 can also be interrupted manually at a signal actuated by the gauge 42. During the gauging period the work piece is replaced with a fresh one.

Figure 11:
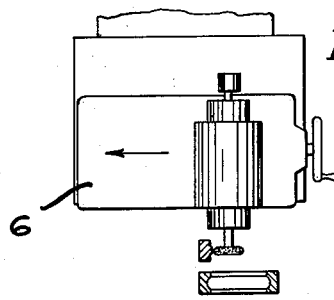
Figure 12:
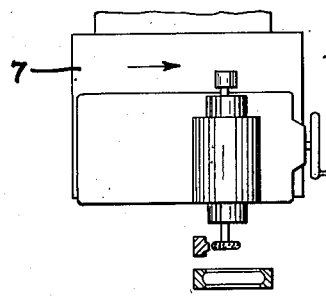
Figure 13:
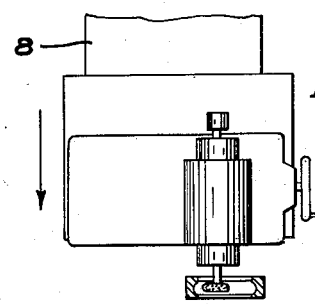
Figure 14:
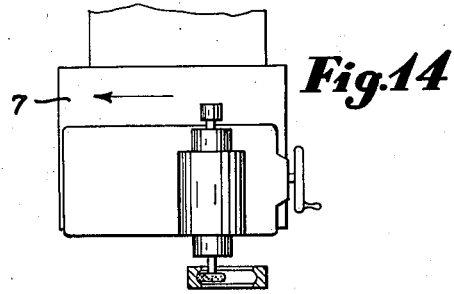

With the wheel thus positioned relative to the cross slide 7 the latter is then retracted by an amount at least equal to the amount of stock to be removed (Fig. 12) so that the wheel will clear the work piece when introduced within it, unless this operation has been accomplished before that of Fig. 11. The linkage mechanism of the Van Norman patent (or separate motors as will be described below) is then put into operation to cause offset of the wheel and introduction of it within the work piece, and finally the feeding motion of slide 7 causes contact between the wheel and work. The grinding cycle is then commenced with the succession of coarse and fine feeds in any manner desired, the slide 7 being arrested in its motion manually, or by a stop or limit switch, at a fixed point with no necessity of gauging the work piece during grinding.

One manner of automatically operating the machine to produce the desired presetting of the grinding wheel is shown in Figs. 15 and 16. The control is accomplished by connecting commercial relays and switches, the construction of which is of no interest here, in such a manner that the sequence of operations described above will be performed automatically once the machine is set in operation. The operating coils and contactors of each relay are, in accordance with convention, shown separate, which greatly simplifies the drawing, but the several parts of a single relay are indicated by a single symbol. Such symbols are keyed to the machine described above in accordance with the following plan. Limit switches are indicated by L followed by the number of the part which operates them, and then by F or R depending on whether they are operated on the forward or return stroke. Thus L8R would be a limit switch operating on motion of table 8 away from the work. Control relays are indicated by C and time delays by T, the number following this letter indicating the part controlled. A normally open contactor is shown by spaced lines, a normally closed one by spaced lines with a diagonal through them; and relay activating coils by a zig-zag line.

On depressing the starting button 49 a relay C8F in line 50 (having a contactor bridging the starting button to permit the latter to be released) is activated, starting the motor (not shown) which drives the table 8 into operative position. The motor is stopped by the limit switch L8F which opens the circuit through C8F. The limit switch has for this purpose a normally closed contact in line 50, but has as well a normally open contact in line 51 in series with normally closed contacts on a relay C7F and the activating coil of a relay C7 which controls the direct current variable feed mechanism for slide 7 shown in Fig. 16. The switch L8F also controls, through a branch line 52, a series of parallel lines 53, 54 and 55.

When C7 is activated current flows (Fig. 16) through the normally closed contacts 58 of relay C7A through a high speed rheostat 56 through the armature 57 of the motor which operates slide 7. The slide will move at a rapid traverse rate until limit switch L7A is closed, which closes the energizing coil of a fast-slow relay C7A, opening contact 58 and closing contact 59. Current then flows through the slow speed rheostat 60 and through the motor armature. The relay C7A has contacts 61 which are closed to bridge L7A, which is closed only momentarily. When limit switch L7F is closed by slide 7 reaching the predetermined position for termination of the grinding operation the relay C7F is activated, opening the normally closed contact in line 51 and deactivating relay C7 to stop the feed. Contacts on relay C7F also bridge L7F to preserve the relay in operation. It should be stated that the several limit switches controlling the motion of slide 7 are preferably mounted on the handwheel 19 or a part similarly geared up rather than directly on the slide itself, in order to magnify the motion and increase the accuracy of the terminal position of the slide when grinding ceases.

Operation of relay C7F also activates line 55 and starts the operation of a time delay relay T7F. When the contacts of this relay close, the line 62 is activated together with the relay C6R, which starts the motor 18 of slide 6 to back the wheel away from the work. The delay caused by T7F is sufficient to permit the wheel and work to "spark out," an operation usually desired in accurate work. Closure of the T7F contacts starts a second time delay relay T6R which controls the duration of the rearward movement of the upper or secondary slide. This backing away is sufficient to clear the wheel gradually from the work, in order to avoid marks; and also insures that the wheel will be positioned in gauging position with no possibility of striking the gauge even though the wheel may have worn less than the estimated amount for which it was preset on the preceding cycle.

When T6R has run its timing cycle its contacts in a line 63 close, and current passes through a normally closed limit switch L8R and through a relay C8R which operates the motor (not shown) which drives table 8 in a direction to withdraw the wheel from the work. The relay has contactors bridging T6R so as to maintain C8R in operative position after the release of the former. As the table 8 moves back L8F is released, resetting relays C7A and C7F, and opening the contacts of the latter which are in line 55 in series with C6R. Interruption of current flow through the latter stops the rearward motion of slide 6.

When the table 8 reaches its "out" position a limit switch L8R is activated, having contacts in line 63 which open to interrupt the current through C8R and stop the table. Contacts of L8R controlling both lines 64 and 65 are closed to activate a time delay relay T6F which has several functions. First it has normally closed contacts in line 66 which when the limit switch L8R is closed activate a relay C7R which drives the motor of main slide 7 rearwardly, so that the wheel will be backed off sufficiently to allow for the amount of stock to be removed from the next work piece. It should be noted that the absolute position of the slide 7 during gauging is of no importance since the gauge 42 moves with the slide and all that gauging does is to reposition the wheel spindle with respect to the slide.

When the time cycle of T6F expires C7R is de-energized, stopping the retraction of slide 7, and contacts of T6F in line 67 are closed, activating a relay C6F which controls the motor 18 which drives the secondary slide 6 to cause it to carry the wheel towards gauge 42. When contact is made the gauge opens its contact, activating an electronic relay 68 which in turn controls a relay 69 energizing the gauge-holding magnet 43 and simultaneously opening the circuit in line 67 to de-energize relay C6F and arrest the forward movement of the secondary slide. The gauging and resetting operation is now complete.

What I claim is:

1. A grinding machine comprising a main and a secondary slide each movable transversely to the surface of the work piece to be ground, means for moving the main slide at a feed rate to a fixed terminal position during each grinding cycle, a grinding wheel mounted on the secondary slide, a gauge mounted on the main slide, and means for moving the secondary slide prior to the start of a grinding operation to bring the active surface of the wheel into contact with the gauge.

2. A grinding machine comprising a main and a secondary slide each movable transversely to the surface of the work piece to be ground, a grinding wheel mounted on the secondary slide, means for moving the main slide at a feed rate to a fixed terminal position during each grinding cycle and to a gauging position with the wheel removed from the work piece between grinding cycles, a gauge mounted in fixed position relative to the main slide when the latter is in gauging position, and means for moving the secondary slide when the main slide is in gauging position to bring the active surface of the wheel into contact with the gauge.

3. A grinding machine comprising a main and a secondary slide each movable transversely to the surface of the work piece to be ground, a grinding wheel mounted on the secondary slide, a gauge mounted on the main slide, means for moving the main slide at a feed rate to a fixed terminal position during each grinding cycle and to a gauging position with the wheel removed from the work piece between grinding cycles, and means for moving the secondary slide when the main slide is in gauging position to bring the active surface of the wheel into contact with the gauge.

4. A grinding machine comprising a main and a secondary slide each movable transversely to the surface of the work piece to be ground, a grinding wheel mounted on the secondary slide, means for moving the main slide at a feed rate to a fixed position during each grinding cycle and to a gauging position with the wheel removed from the work piece between grinding cycles, a gauge mounted in fixed position radially of the work piece, means including a prime mover for moving the secondary slide relative to the main slide, means for activating said prime mover when the main slide is in gauging position to move the secondary slide in a direction to cause the wheel to approach the gauge, and means for stopping the prime mover when the wheel contacts the gauge.

5. A grinding machine comprising a main slide and a secondary slide each movable transversely to the surface of the work piece to be ground, a grinding wheel mounted on the secondary slide, means for moving the main slide at a feed rate to a fixed position during each grinding cycle and to a gauging position with the wheel removed from the work piece between grinding cycles, a gauge mounted in fixed position relative to the main slide when the latter is in gauging position, a lead screw connecting the main and the secondary slides, a prime mover for activating said lead screw when the main slide is in gauging position for rotating the lead screw to shift the secondary slide in a direction to move the grinding wheel toward the gauge, and means activated by contact between the wheel and the gauge for stopping the prime mover.

6. In a grinding machine comprising a slide, means for moving said slide transversely to the surface of the work piece to be ground at a feed rate to a fixed terminal position during each grinding cycle, a grinding wheel rotatable on said slide and mounted for movement relative thereto in a direction transverse to the surface of the work piece to be ground, a gauge fixed relative to the slide, means for moving the grinding wheel relative to the slide prior to the start of a grinding cycle and while the slide is in said fixed terminal position to bring the active surface of the wheel into contact with the gauge, and means actuated by the gauge upon contact with the wheel for stopping further advance of the wheel relative to the slide.

ROGER S. PYNE.

REFERENCES CITED

The following references are of record in the file of this patent:

UNITED STATES PATENTS

| Number | Name | Date |
| --- | --- | --- |
| 1,102,558 | Van Norman | July 7, 1914 |
| 1,473,520 | Rosak | Nov. 6, 1923 |
| 1,549,600 | Mueller | Aug. 11, 1925 |
| 1,602,680 | Knowles | Oct. 12, 1926 |
| 1,840,231 | Harrison et al. | Jan. 5, 1932 |
| 1,872,667 | Bryant | Aug. 23, 1932 |
| 1,914,995 | Guild | June 20, 1933 |
| 1,997,978 | Raule | Apr. 16, 1935 |
| 2,050,261 | Blood | Aug. 11, 1936 |
| 2,092,876 | Cramer | Sept. 14, 1937 |
| 2,127,210 | Dunbar | Aug. 16, 1938 |
| 2,141,853 | Brown | Dec. 27, 1938 |
| 2,280,692 | Elberty | Apr. 21, 1942 |
| 2,326,339 | Dudgeon | Aug. 10, 1943 |